United States Patent
Olson et al.

(10) Patent No.: US 6,324,598 B1
(45) Date of Patent: Nov. 27, 2001

(54) SOFTWARE ENLARGED TAG REGISTER AND METHOD THEREOF FOR NOTING THE COMPLETION OF A DMA TRANSFER WITHIN A CHAIN OF DMA TRANSFERS

(75) Inventors: Steven E. Olson, Los Altos; Ning Zhou, Fremont, both of CA (US)

(73) Assignee: Oak Technology, Sunnyvale, CA (US)

( * ) Notice: Subject to any disclaimer, the term of this patent is extended or adjusted under 35 U.S.C. 154(b) by 0 days.

(21) Appl. No.: 09/228,474

(22) Filed: Jan. 11, 1999

(51) Int. Cl.$^7$ ................................................ G06F 13/10

(52) U.S. Cl. .................. 710/24; 710/22; 710/62

(58) Field of Search ................ 710/22–24, 57, 710/62, 64, 260; 711/100

(56) References Cited

U.S. PATENT DOCUMENTS

| | | | |
|---|---|---|---|
| 5,025,408 | * 6/1991 | Sherman | 708/627 |
| 5,251,312 | 10/1993 | Sodos . | |
| 5,253,353 | 10/1993 | Mogul . | |
| 5,299,314 | * 3/1994 | Gates | 710/64 |
| 5,835,788 | * 11/1998 | Blumer et al. | 710/23 |
| 6,145,049 | * 11/2000 | Wong | 710/267 |

FOREIGN PATENT DOCUMENTS

405257866A * 10/1993 (JP) .

* cited by examiner

*Primary Examiner*—Thomas Lee
*Assistant Examiner*—Thuan Du
(74) *Attorney, Agent, or Firm*—Kevin L. Daffer; Conley, Rose & Tayon P.C.

(57) ABSTRACT

A computer system, bus interface unit, and method is provided for noting a control block transfer at which an interrupt occurs. The control block is but one control block within a chain of control blocks necessary to effectuate a chain of DMA transfers. If the control block undergoes an interrupt, that control block must be noted and control information associated therewith placed within a register so that when the DMA transfers are resumed, that control block can be immediately pointed to rather than having to initiate the first control block of the chain up to and including the control block undergoing interrupt. By purposely programming interrupts within the tag field of select control blocks and maintaining a software tag register within system memory, a control block within an expanded number of control blocks within a chain can be kept track of and pointed to following an error-induced interrupt. The software-induced interrupts are therefore purposely distinguishable from error-induced interrupts, and are used to extend the range of the hardware tag register normally fixed in size within the DMA controller.

18 Claims, 5 Drawing Sheets

| CB# | TAG FIELD VALUE (N=4) | SW TAG VALUE |
|---|---|---|
| 0 | 0 | 0 |
| 1 | 1 | 0 |
| 2 | 2 | 0 |
| ... | ... | ... |
| 15 | 15 | 0 |
| 16 | 0 | 1 |
| 17 | 1 | 1 |
| ... | ... | ... |
| 31 | 15 | 1 |
| 32 | 0 | 2 |
| 33 | 1 | 2 |
| ... | ... | ... |
| 255 | 15 | 15 |

*FIG. 3*

| CB# | TAG FIELD VALUE (N=2) | SW TAG VALUE | INT. | PRE. TAG VALUE | START CB# |
|---|---|---|---|---|---|
| 0 | 0 | 0 | - | 0 | 0 |
| 1 | 1 | 0 | - | 0 | 0 |
| 2 | 2 | 0 | 1 | 0 | 0 |
| 3 | 3 | 0 | - | 2 | 3 |
| 4 | 0 | 0 | - | 2 | 3 |
| 5 | 1 | 1 | 2 | 2 | 3 |
| 6 | 2 | 1 | - | 1 | 6 |
| 7 | 3 | 1 | - | 1 | 6 |
| 8 | 0 | 2 | 3 | 1 | 6 |
| 9 | 1 | 2 | - | 0 | 9 |
| 10 | 2 | 2 | - | 0 | 9 |
| 11 | 3 | 2 | 4 | 0 | 9 |
| 12 | 0 | 2 | - | 3 | 12 |
| 13 | 1 | 2 | - | 3 | 12 |
| 14 | 2 | 2 | 5 | 3 | 12 |
| 15 | 3 | 3 | - | 2 | 15 |
| ... | ... | ... | ... | ... | ... |

*FIG. 4*

| CB# | TAG FIELD VALUE | | SW TAG VALUE |
|---|---|---|---|
| 0 | 0 | | 0 |
| 1 | 0 | | 0 |
| 2 | 0 | | 0 |
| ... | ... | | ... |
| a | 1 | ← 60a | 1 |
| a+1 | 0 | | 1 |
| a+2 | 0 | | 1 |
| ... | ... | | ... |
| b | 2 | ← 60b | 2 |
| b+1 | 0 | | 2 |
| b+2 | 0 | | 2 |
| ... | ... | | ... |
| c | 3 | ← 60c | 3 |
| c+1 | 0 | | 3 |
| c+2 | 0 | | 3 |
| ... | ... | | ... |
| d | 15 | ← 60d | 15 |
| d+1 | 0 | | 15 |
| ... | ... | | ... |
| e | 1 | | 16 |
| e+1 | 0 | | 16 |
| ... | ... | | ... |

*FIG. 6*

| SW TAG VALUE | EXP. TAG FIELD VALUE | CB# ADDRESS |
|---|---|---|
| = | = | = |

SOFTWARE ENLARGED TAG REGISTER AND METHOD THEREOF FOR NOTING THE COMPLETION OF A DMA TRANSFER WITHIN A CHAIN OF DMA TRANSFERS

BACKGROUND OF THE INVENTION

1. Field of the Invention

This invention relates to a computer system, a bus interface unit, and a tag register within system memory of the computer for enlarging the number of a direct memory access ("DMA") transfers within a chain of DMA transfers which can be kept track of without enlarging a tag register within the bus interface unit or, more particularly, within a DMA controller of the bus interface unit.

2. Description of the Related Art

A time-consuming activity of a microprocessor entails moving blocks of memory from one subsystem within a computer system to another subsystem. The memory-moving chores can, in some instances, be handled by a DMA controller.

A DMA controller may include a specialized processor and numerous registers which keep track of the base location or source from which bytes of data are to be moved, the address or destination to where those bytes should be placed, and the number of bytes involved in the move operation. By noting the source, destination, and general operating parameters of the DMA transfer, the DMA controller allows direct communication from a peripheral device to system memory, or directly between peripheral devices (i.e., devices connected to a peripheral bus within the computer system). The DMA controller thereby provides communication without intervention of the host processor.

The mechanism by which the DMA controller provides a channel between the peripheral device and the system memory occurs in accordance with a channel program or control blocks programmed within the system memory. Control blocks contain fields which are programmed with values that, when fetched by the DMA controller, instructs the DMA controller to transfer the desired data to or from system memory. In addition to having a transfer control field, each control block may also contain a field which denotes a specific buffer within the DMA controller. That buffer will then be used to receive data transferred to or from a peripheral device (depending on whether the transfer operation is a read request or write request cycle).

The control blocks are essentially storage locations within the system memory, and may be partially programmed during boot-up of the computer system. An important advantage in using control blocks is that one control block can point to a successive control block, and so forth to form a "chain" of control blocks. Therefore, each control block is used to control a single DMA transfer of data, and by linking numerous control blocks together in a chain, a sequence of DMA transfers can occur without host processor intervention. Thus, in addition to the transfer field and the buffer pointer field, each control block may also have a pointer field directed to the next control block within the sequence. A description of control blocks, and control block chaining, is set forth in further detail within, for example, U.S. Pat. No. 5,251,312 (herein incorporated by reference).

The number of control blocks that can be chained together is limited by the amount of memory allocated to the DMA controller. If sufficient space is properly allocated, a rather large sequence of DMA transfers can be controlled by the chain of control blocks. The transfer sequence will continue until data attributed to the entire chain has been transferred, if an error is detected and acknowledged by the DMA controller, or when the program wants indication of the current quantity of data DMA-transferred. A tag field within a hardware tag register of the DMA controller serves to denote which particular block was being processed within the chain when the interrupt occurred. The interrupt may have been intentional, in that a software program (operating system or application program) might be set to indicate when the DMA controller had transferred a certain quantity of data. Alternatively, the interrupt may have been unintentional by virtue of the interrupt signaling that an error in processing occurred. More specifically, each control block contains a unique tag field value. That value is forwarded within the respective control block within the chain as the chain of control blocks are being processed. When the DMA controller induces either an unintentional or intentional interrupt, the tag value of the currently fetched or "processed" control block is recorded in the controller's hardware tag register. Once the interrupt has been serviced, the DMA transfers can then be resumed, or the entire transfer aborted. Beneficially, however, the DMA transfers begin with control blocks immediately succeeding the control block which has its tag value stored in the hardware tag register. In this manner, DMA transfers can be quickly resumed at the point in which the interrupt occurs.

Many DMA controllers available in the marketplace have a tag field, and a fixed number of bits within the hardware tag register. However, the number of control blocks within a chain is variable, and there may be instances in which the number of chained control blocks can exceed those fixed number of bits. Merely as an example, conventional DMA controllers may reserve only four bits to the hardware tag register. If the chain is to exceed $2^4$, or 16 control blocks, then not all control blocks can be uniquely identified such that a control block immediately succeeding an interrupt can be directly resumed after an error has been solved. In this instance, processing the chain after interrupt must resume at the first control block within the chain, even though possibly one-half or more of the chain have been processed prior to the interrupt. Having to proceed with earlier-processed control blocks subsequent to interrupt, imposes a significant performance penalty upon the memory bus and thereby limits the overall benefit of chaining.

It would be desirable to introduce a mechanism for keeping track of a larger number of control blocks, and the position of a control block within a rather large chain during an interrupt. It would be further beneficial to implement the mechanism without having to change the fixed number of bits within the hardware tag register, or having to change any hardware component within the DMA controller itself. The desirous mechanism is therefore one which can modify and enhance many existing DMA controller currently available in the marketplace for the benefit of accommodating a rather large and variable length chain of control blocks.

SUMMARY OF THE INVENTION

The problems outlined above are in large part solved by an improved DMA controller and computer system hereof. The DMA controller includes a hardware tag register having a fixed number of bits; however, additional bits are available within a software-induced tag register (hereinafter "software tag register"). The software tag register is one that is formed within system memory and called upon by a program embodied within the computer system memory or host main memory. More specifically, interrupts are intentionally placed at periodic intervals within control block fields of select control blocks. That is, each control block may be designed having an interrupt control field which can be programmed to initiate an interrupt of the host processor. Once the interrupt control field is programmed within a sequence of interrupt control fields to initiate an interrupt, that interrupt will force the host processor to note certain values contained within registers of the DMA controller as well as values within the software tag register. The interrupts are typically used to indicate that the buffer has reached a certain state of fullness, and therefore are somewhat regular but do not always consistently occur in periodic time-based cycles. Instead, the interrupts occur based on the speed at which the buffer fills and/or the speed at which the buffer empties.

According to one embodiment, each interrupt will be used to note the current tag field value of the currently processed control block and to compare that value with a previous tag field value of a previous control block which underwent the previous interrupt. If the current tag field value is less than the previous tag field value, then the software tag value within the software tag register is incremented. Additionally, the previous tag field value is updated with the current tag field value, and DMA transferred data is processed from a starting control block number to an ending control block number. The starting control block number is one control block number (i.e., numbered value) greater than the previously ended control block number. The ending control block number is represented as the summation of the current tag field value and the software tag value shifted upward by N bits, where N represents the number of bits within the hardware tag register. The software tag register can thereby be thought of as an extension to the hardware tag register, beginning at the most significant bit (i.e., Nth bit) of the hardware tag register. The data controlled by the control block is therefore dependent on when the immediately preceding interrupt occurs within the chain, such that processing of DMA transfers takes place from the control block encountering the immediately preceding interrupt and the control block undergoing the most current interrupt. It is therefore important to maintain the current and previous tag field values of the current and previous interrupts, and to appropriately increment the software tag value based on a comparison of the current and previous tag field values. It is also important to make note of the start control block number and end control block number, and to continuously update the start control block numbers and previous tag values for each interrupt that may occur within the chain.

According to another embodiment, it is noted that while an interrupt may be initiated by the DMA controller, servicing of that interrupt may possibly not occur until after the next interrupt is initiated. As with many modern host processors, a significantly large pipeline or cycle stages/phases may be present. Cycles within the pipeline must be executed (i.e., flushed) before the processor can operate on the interrupt cycle. Clearing or flushing the pipeline may take a rather large number of cycles to complete. Interrupts can occur (and be missed) in the interim or, more importantly, interrupts can occur and be "missed" because the interrupt service routine took too much time. In this instance, interupts are masked off so the device only sees the first interrupt. The cache may or may not be flushed during interrupt handling. In instances where an interrupt is missed, it is important to note the amount of interrupts that are missed within a register of the DMA controller. The number of missed interrupts can then be added to the software tag value within the software tag register to arrive at an expected tag field value. The current tag field value can then be compared against the expected tag field value. If the two are equal, then data is processed from the starting control block number at which an interrupt was processed to an ending control block number, represented as the software tag value plus the number of missed interrupts. The starting control block number must be updated upon successful interrupts, and the missed interrupt counter must also be reset when a successful interrupt is encountered.

Broadly speaking, a computer system is provided which implements the present hardware and software tagging scheme or mechanism. The computer system comprises a bus interface unit operably linked between a processor, a system memory, and a peripheral device for transferring a chain of DMA cycles between the peripheral device and the system memory. The computer system also stores an identifier of a DMA cycle into storage devices within both the bus interface unit and the system memory at a time in which an interrupt is forwarded to the processor. The system memory is defined as semiconductor memory and, more specifically, an array of storage elements embodied upon at least one semiconductor substrate. The peripheral device includes any device which can be coupled to a peripheral bus, and can read or write data directly to and from system memory. The identifier includes any sequence of bits, known as a field, wherein the field comprises a tag field value and a software tag value. The tag field value is stored in a hardware tag register within the bus interface unit, and the software tag value is stored within a portion of system memory, known as a software tag register.

An apparatus is also provided comprising a system memory and a DMA controller. The system memory includes the software tag register and further includes a portion of the system memory configured to store a chain of control blocks used to control data transfers within a chain of corresponding DMA transfers. Each of the chain of control blocks includes a tag field value. The tag field value within one control block can be programmed to induce an interrupt. Specifically, inducement of an interrupt is brought about via intentional (e.g., software driven) interrupts. However, if an error occurs, and an unintentional interrupt is brought about on the same control block that is undergoing intentional interrupt, the special considerations must be made to note this error, and where it occurred. Otherwise, the error-induced interrupt would not be recorded in favor of the intentional interrupt. A status register is therefore used to note the error-induced interrupt by setting an appropriate error tag value in the appropriate control block when the unintentional interrupt occurs. While the tag register will contain a watermark (intentional) interrupt that occurs in regular fashion, an additional error tag value will note that possibly one of the intentional interrupts occurred during processing of a control block at which an unintentional interrupt occurred. Thus, if the tag register has a valid tag, the status register must also be checked to see if the interrupt was caused by an error, or whether the interrupt was solely intentional. Absence of an error tag denotes the interrupt as an intentional interrupt. An intentional interrupt is therefore one that is regularly spaced across a chained sequence of control blocks to purposely store tag field values and update the software tag value at regular intervals. The intentional interrupts are distinguishable from error-induced interrupts caused by computer system failure by examining a combination of the tag field and the error tag value. The DMA controller is coupled to system memory, and is configured to receive a tag field value and produce a software tag value during select times when the DMA controller initiates a current, intentional interrupt cycle. The combination of the tag field value and the software tag value defines when the data transfers attributed to at least one of the chain of control blocks is to be forwarded.

The DMA controller and hardware tag register operate in conjunction to store a next tag field value and set the tag field value (i.e., current tag field value) to a previous tag field value during initiation of an interrupt cycle following the current interrupt cycle. The DMA controller is further configured to forward data transfers associated with control blocks arising in the interim between a control block having the next tag field value and a control block having the previous tag field value.

The DMA controller may comprise logic which notes a control block being transferred during initiation of the current interrupt cycle, and further notes if a subsequent interrupt cycle immediately following the current interrupt cycle is missed due to a DMA transfer associated with the current interrupt cycle not being completed before the subsequent interrupt cycle occurs. The logic may be further used to compare the tag field value stored within the hardware tag register with the summation of the software tag value within the software tag register and the number of interrupt cycles missed. If the logic determines the tag field value is equal to the software tag value plus the number of interrupt cycles missed, then the DMA may be configured to forward data transfers attributed to control blocks which culminate in a control block called upon when the missed interrupt cycle occurs.

According to yet another embodiment, a method is provided for controlling the transfer of data associated with a chain of DMA cycles. The method includes forwarding a chain of control blocks which control transfer of data associated with respective ones of the chain of DMA cycles. A control block is contained within the chain of control blocks being transferred during a time in which an interrupt occurs. An identifier is placed into a hardware tag register and a software tag register noting the control block being transferred during the interrupt. A portion of the chain of DMA cycles up to a DMA cycle attributed to the control block is then transferred.

BRIEF DESCRIPTION OF THE DRAWINGS

Other objects and advantages of the invention will become apparent upon reading the following detailed description and upon reference to the accompanying drawings in which:

FIG. 3 is a table showing an N=4 bit tag field within each control block, and the effect of an interrupt upon the software tag register when the interrupt occurs once every $2^N-1$ control block transfers;

FIG. 4 is a table showing an N=2 bit tag field within each control block, and the effect of an interrupt upon the software tag register as well as starting and ending control blocks processed during intervals between interrupts;

FIG. 6 is a table showing control blocks grouped together and noted by a tag field value which, depending on that value, initiates interrupts and increments the software tag register;

FIG. 7 is an array of software tag values corresponding with control block addresses and expected tag field values.

Figure 1:
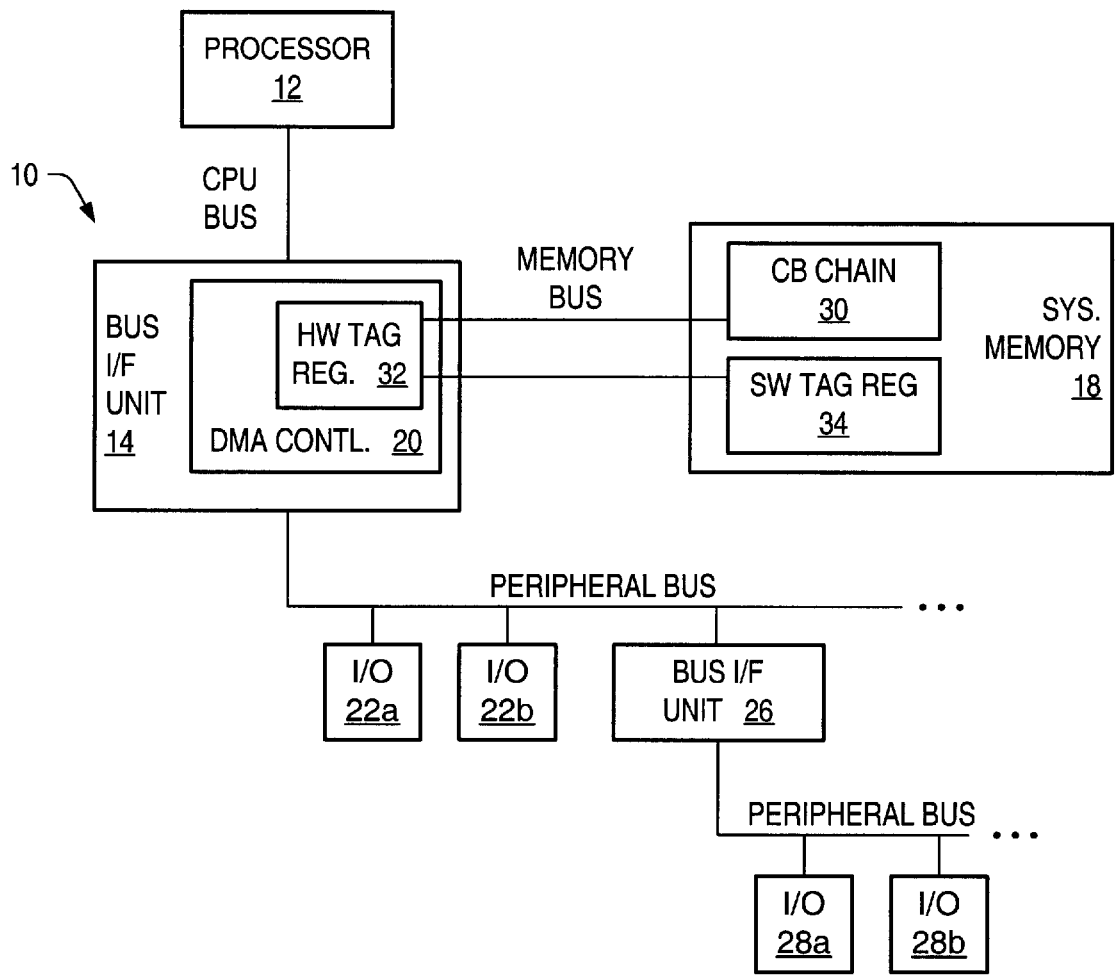
FIG. 1 is a block diagram of a computer system including a hardware tag register within a DMA controller linked to a software tag register within system memory.

While the invention may be modified and have alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Turning to the drawings, FIG. 1 illustrates a computer system 10 having multiple buses, including a CPU bus, a mezzanine or PCI bus, and other peripheral buses. The CPU bus connects to a host processor 12 and a bus interface unit, or northbridge 14. A cache memory can be embodied within processor block 12, or coupled directly to the CPU bus.

Northbridge 14 provides an interface between components clocked at dissimilar rates. Northbridge 14 may also contain a memory controller which allows communication to and from system memory 18. The memory controller can further include a controller which controls DMA transfers to and from system memory 18, and is henceforth referred to as a DMA controller 20. System memory 18 comprises random access memory embodied upon a semiconductor substrate, and possibly partitioned among chips or DIMM structures. As shown, DMA controller 20 can form a portion of the bus interface unit. However, it is understood that DMA controller 20 can simply be connected somewhere on the peripheral bus. For example, DMA controller 20 can be coupled on the peripheral bus between the peripheral device 22a/22b and the bus interface unit, or can form a part of the peripheral device 22a/22b. In either instance, it is noted that DMA controller is logically and operationally coupled somewhere between system memory and the peripheral device, regardless of where that peripheral device exists within the overall computer system.

Northbridge 14 may also include graphics support to allow communication to and from high speed, advanced graphics ports. Northbridge 14 can be considered an application specific chip set or application specific integrated circuit (ASIC) that provides connectivity to various buses and integrates other system functions such as memory interface and DMA control. System memory 18 can include any semiconductor memory considered the main memory and refers to a portion of addressable memory that the majority of memory accesses target. System memory 18 is sometimes considered the largest continuous memory space of computer 10.

Connected to northbridge 14 is a peripheral bus upon which various input/output devices 22a/22b can be coupled. Another bus interface unit, or southbridge 26, can be connected between peripheral buses. Southbridge 26, similar to northbridge 14, adapts transfer protocols from one bus to that of another, and provides buffers to handle what could be substantially dissimilar transfer rates between those buses.

The bus nearest host processor 12 can be considered a mezzanine bus, such as a PCI bus, while the buses furthest from host processor 12 can be considered, for example, an IDE or ISA, etc. Coupled to an ISA or IDE bus can be larger, electromechanically driven memory systems such as, for example, hard disk drives or CD-ROMs. Thus, input/output devices 28a/28b can be used to store large amounts of data and have generally larger access and latency times that system memory 18.

Further illustrated in FIG. 1 is the interface between system memory 18 and DMA controller 20. Included within system memory 18 is a memory location dedicated to receiving a chain of control blocks 30 programmed during boot-up of system 10. Control block chain 30 contains various fields which, when fetched by DMA controller 20, control associated DMA transfers by said controller. Whenever an interrupt occurs, a specific field, known as a tag field, is stored within a hardware tag register 32. Since the number of bit locations within hardware tag register 32 may be insufficient to denote all control blocks within a chain (or bits within the tag field), extensions to the hardware tag register 32 are needed. Those extensions can come in the form of a software-induced tag register or software tag register 34. The software tag register 34 can be thought of, according to one embodiment, as an addition or concatenation to the hardware tag register.

The control block chain 30 contains fields which are purposely programmed to allow a predefined number of control blocks within a chain to cause a regular, periodic interrupt of the processor. That interrupt will then signal update to the hardware tag register and, more specifically, will place an overflow value within the software tag register 34. That "overflow" will be noted as a start and end control block number, a current and previous control block number, etc., necessary to keep track of which control blocks are to be processed after an interrupt--even though an interrupt might be missed in the interim.

Figure 2:
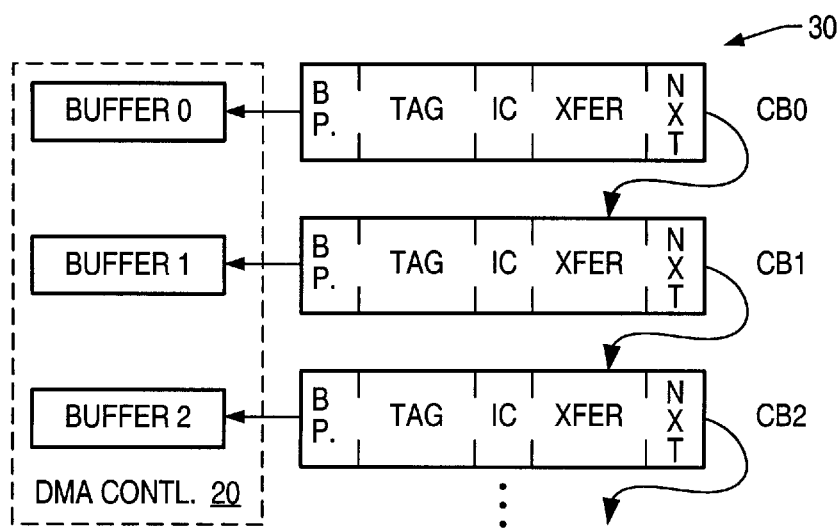
FIG. 2 is a block diagram of fields within control blocks of several DMA cycles linked together as a chain of control blocks loaded into system memory, and each of the control blocks are shown having a buffer pointer field which points to a buffer within the DMA controller of FIG. 1.

FIG. 2 illustrates control block chain 30 pointing to respective buffers within DMA controller 20. For example, the first control block (CB0) points to buffer 0 via a buffer pointer (BP). CB0 also contains a field, noted as next or "NXT", which points to the next control block in the sequence of control blocks. The next control block (CB1) also contains a buffer pointer which points to buffer 1, and a next pointer which points to CB2, and so forth for each control block within the control block chain 30.

Each control block shown within control block chain 30 also contains a transfer field which indicates the source and destination of the DMA transfer, as well as the byte length to be transferred. Another field, known as an interrupt control or "IC" field is used to determine if an interrupt is to be induced. For example, CB0 and CB1 may have the IC fields programmed not to interrupt, while CB2's IC field is programmed to interrupt. This pattern can be repeated for all control blocks within the chain so that, e.g., every third control block will induce an interrupt. In addition to the other fields mentioned above, a tag field may be present for each control block. The tag field represents a unique tag value for that particular control block. For example, the tag field for CB0 can be numeral 0, whereas the tag field value for CB1 can be numeral 1, etc.

FIG. 3 indicates an example of the overflow from a tag field value stored within the hardware tag register, and the update of a software tag value stored within the software tag register (both registers are those shown in FIG. 1). Referring to FIGS. 1, 2, and 3, in combination, it is noted that FIG. 3 illustrates a four bit (N=4) tag field value sent from a respective control block to the hardware tag register. However, the number of control blocks is shown to exceed $2^N$, or 16. In instances where the control blocks exceed 16, on the $2^N$ control block, an overflow occurs and the software tag value must be properly incremented. Thus, FIG. 3 illustrates an embodiment in which one interrupt is programmed into the tag field of a control block within the chain so that the interrupt occurs once every $2^N-1$ control blocks, where N is the width of the hardware tag register in bits. Thus, where N=4, an interrupt is generated at least once every 15 control blocks. The interrupt will cause an increment of the software tag value stored within system memory such that an additional four bits can be concatenated to the hardware tag register. Those additional bits are found within the system memory, and are brought about by programming an interrupt at least once for every $2^N-1$ control blocks. Programming an interrupt is achieved by programming the interrupt control field within a appropriately spaced control block within the chain.

Figure 5:
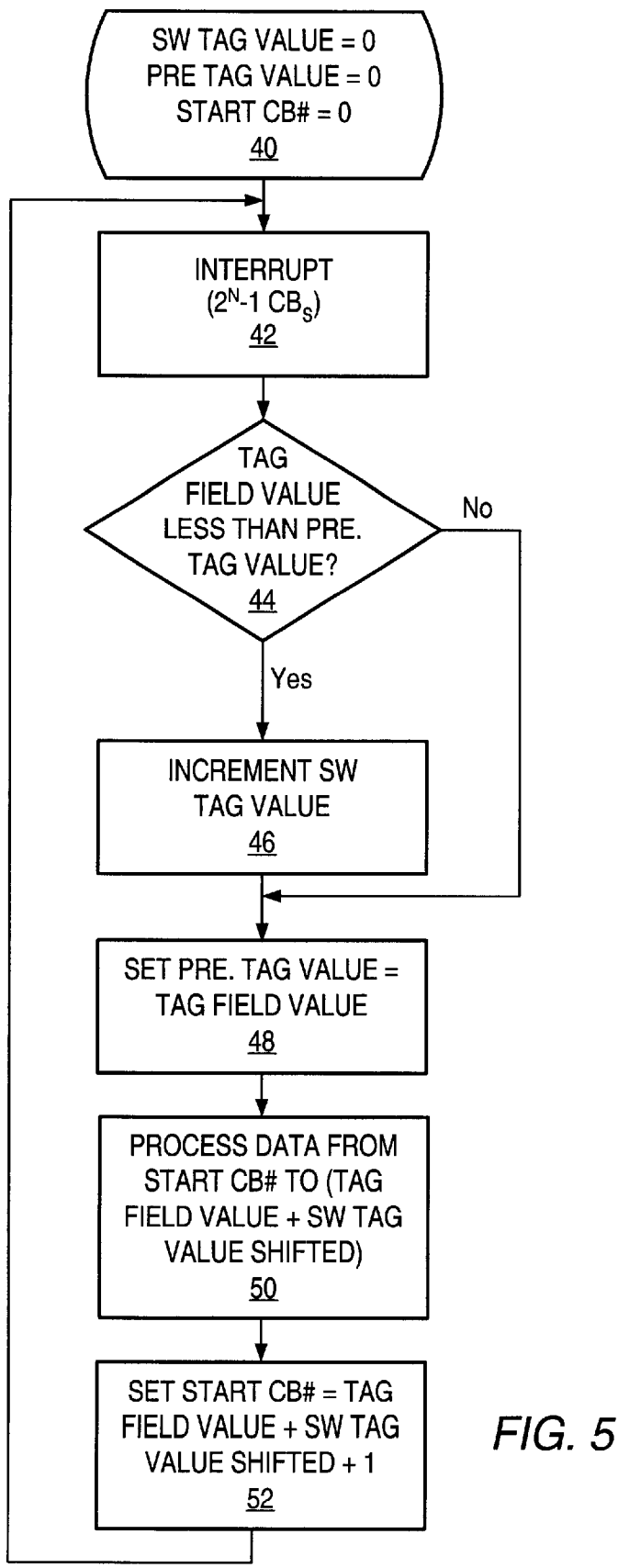
FIG. 5 is a flow diagram of steps taken to increment the software tag register and keep track of which control blocks should be processed at each interrupt, according to the embodiments at least partially the shown in FIGS. 3 and 4.

FIG. 4 indicates further details of when an interrupt occurs, and the setting of a previous tag value relative to the current field value. FIG. 4 also illustrates the starting and ending control block numbers through which processing occurs between interrupts. The current and previous tag values, starting and ending control block numbers, and periodic interrupts are best illustrated in reference to FIGS. 4 and 5, in combination. FIG. 4 illustrates a tag field value of two bits (N=2) where the hardware tag register can accommodate only two bits. However, it is understood that the hardware tag register can accommodate more than two bits, if desired. For sake of brevity and clarity in the table of FIG. 4, a maximum of two bits is used. Beginning with the initial control block within the chain, all tag values and start control block values are set to 0, as indicated by block 40 (FIG. 5). The first tag field value of 0 is read from control block 0. It is not until the third control block (i.e., $2^N-1=3$) is read (control block number 2) that an interrupt will occur. That interrupt is shown as the first interrupt in FIG. 4. FIG. 5 illustrates the interrupt block 42 occurring, e.g., upon the third control block 2. A decision is now made on whether the tag field value at control block number 2 (i.e., tag field value 2) is less than the previous tag value. Since the previous tag value is set to 0, the current tag field value 2 is greater than 0. The decision block is shown as item 44, and since the current tag field value is greater than the previous tag field value, the software tag value is not incremented, as shown in block 46. Thus, FIG. 4 illustrates the software tag value is not incremented during the transfer of control block number 2 at the first interrupt. However, the next decision block in FIG. 5 indicates the current tag value ("tag field value") is set to the previous tag value. This is shown in the example as setting the previous tag value to 2 during transfer of control block number 3, noting that the current tag value was a number 2 during transfer of control block number 2. After the previous tag value is set by decision block 48, data is processed from the starting control block number, which in this case is control block 0 to an ending control block number. The ending control block number is represented as the tag field value which occurred during the first interrupt plus the software tag value during the first interrupt shifted two bit locations. Thus, the ending control block number is equal to 2 (current tag field value plus the software tag value 0 shifted two bit locations). This then ensures data is processed from control block number 0 to control block number 2 (i.e., up to the first interrupt). Processing of data is shown by decision block 50, and the starting control block number is updated at decision block 52. In particular, the starting control block number is set to the ending control block number plus 1. Since the ending control block number is 2, the new starting control block number is 3.

The aforementioned sequence is repeated for each interrupt. The current tag field value is compared against the previous tag field value. During, for example, the second interrupt, occurring at control block number 5, a comparison is made on whether the current tag field value of 1 is less that the previous tag field value, shown in FIG. 4, as 2. Since the decision at block 44 is in the affirmative, the software tag value is incremented, as shown by decision block 46, and as indicated in the software value column for control block number 5. Thereafter, the previous tag field value is set to the current tag field value, and data is processed from the starting control block number to the ending control block number, wherein the ending control block number denotes what will now be the new starting control block number. In particular, data will be processed from starting control block number 3 through ending control block number 5. The ending block number equals 1 (i.e., current tag field value of 1 at control block number 5) plus 4 (i.e., software tag value of 1 at control block number 5 shifted two bit locations).

The sequence of determining tag field values and comparing those against previous tag values, and processing DMA transfers from a starting control block number to an ending control block number is repeated for each interrupt, and the software tag value is shown to increment at select interrupts.

Figure 8:
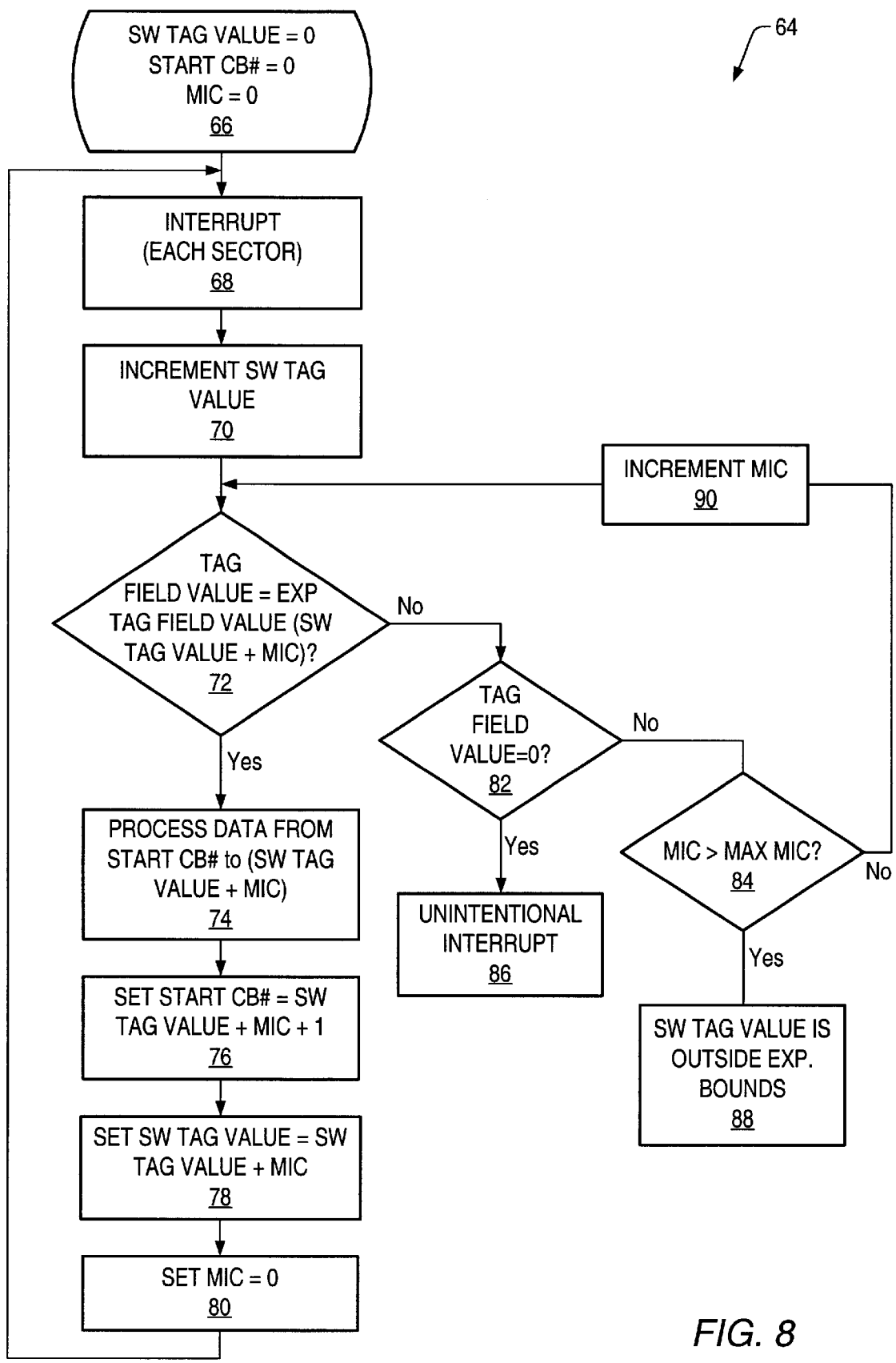
FIG. 8 is a flow diagram of steps taken to increment the software tag register and keep track of which control blocks should be processed at each interrupt, according to the embodiments at least partially shown in FIGS. 6 and 7.

FIGS. 6, 7, and 8 illustrate another embodiment indicative of instances where an interrupt can be missed. Specifically, an interrupt can be signaled by the DMA controller, but not serviced until after another interrupt is signaled by the DMA controller. In those instances, the interrupt is said to have been missed, and must be noted as having been missed by a register within the DMA controller. For example, if the DMA controller signals an interrupt, yet the number of cycles needed to flush the processor bus pipeline exceeds $2^N-1$, then the next interrupt will occur before the previous interrupt has been serviced. That previous interrupt is therefore noted within the interrupt count register and applied to determining an expected tag field value. That is, the current tag field value should equal an expected tag field value. If it does not, then it is determined that the interrupt is not an interrupt that is purposely induced, but is rather an interrupt indicating an error by the computer system. However, if the current tag field value matches the expected tag field value, then data will be processed from the starting control block number to an ending control block number and the starting control block number will be updated, similar to the first embodiment.

FIG. 6 illustrates an interrupt 60 programmed within the tag field of various control blocks. The interrupts occur on non-zero tag values. Specifically, the tag field values are programmed with a first interrupt 60a, another control block is programmed with a second interrupt value 60b, and so forth. All control blocks which do not induce an interrupt are maintained with a 0 tag field value. It is only during an interrupt that the software tag value is incremented. Thus, FIG. 6 illustrates a sector or grouping of control blocks, each sector having a tag field value unique to that group, and the software tag value being set during an interrupt and maintained in the interim until another interrupt.

FIG. 7 illustrates an array useful in storing the expected tag field values and corresponding control block addresses for a specific software tag value. Thus, a software tag value of, e.g., 3 can be directed specifically to a control block address, shown in FIG. 6, as "c", rather than c+1 or c+2, etc. An expected tag field value is to correspond with each software tag value. The expected tag field value within array 62 constitutes the software tag value and the number of missing interrupts counted and present within the interrupt count register. More specifically, there may be missed interrupts from the previous software tag value which must be accounted for so as to bring the expected tag field value up to the current tag field value. The mechanism for processing DMA transfers, using the expected tag field value and the missed interrupt count value is better illustrated in reference to FIG. 8.

FIG. 8 illustrates a flow diagram, similar in many respects to that of FIG. 5. Specifically, the software tag value, the starting control block number, and the missed interrupt count are set to 0 at the initiation of the control block chain, as shown by block 66. An interrupt is purposely induced by programming a tag field value within one control block of each sector a, b, c, etc., as shown by decision block 68. During each interrupt of an associated control block within a sector, the software tag value is incremented 70. The number of control blocks within a sector can be quite large and at least one, and possibly numerous, interrupt signals can be forwarded by the DMA controller yet not serviced by the host processor. The number of missed interrupts must be counted and placed in the missed interrupt count register, where that number is then added to the software tag value. The summation of these two numbers is then placed within the expected tag field value of array 62 (FIG. 7). If the current tag field value which occurs at an interrupt cycle is equal to the expected tag field value, as shown by reference numeral 72, then data is processed from a starting control block to an ending control block, as shown by decision block 74. In the example of FIG. 6, the current tag field value at control block number b is 2. The software tag value at control block number b is also 2 and since no interrupt count numbers have been missed, then the tag field value equals the expected tag field value, whereby data can now be processed from a starting control block number to an ending control block number. The ending control block number is equal to the expected tag field value. The starting control blocking number can now be reset to the expected tag field value plus 1, as shown by reference numeral 76. Likewise, the software tag value can be reset to the current software tag value plus the missed interrupt count value, if present, as shown by reference numeral 78. The missed interrupt count can thereafter be reset to 0, as shown by reference numeral 80.

If the tag field value does not equal the expected tag field value, then it is noted that the tag field value is either 0, or the missed interrupt count exceeds a maximum allowable missed interrupt count, as noted by decision blocks 82 and 84, respectively. An interrupt which occurs on a tag field value of 0 is noted as an unintentional interrupt 86. An unintentional interrupt is defined as an interrupt not induced by the programmer upon the tag field values. Instead, an unintentional interrupt occurs through an error during the DMA transfer, or an error arising within the computer system beyond the control of the present software-induced interrupt scheme.

A missed interrupt count which exceeds a maximum, predefined interrupt count value is noted as having a software tag value that is outside a normally expected bounds 88. Thus, a certain number of missed interrupts can be tolerated. However, if that number exceeds a predefined limit, then the interrupt will fall within the classification as an unintentional interrupt. If the missed interrupt count does not exceed the maximum missed interrupt count value, then the interrupt count is simply incremented 90 until that count value, in combination with the software tag value, equals the current field value. The sequence shown in FIG. 8 is repeated for each control block within the chain, causing the missed interrupt count, the starting and ending control block numbers, and the software tag values to be set accordingly.

Various modifications and changes may be made as would be obvious to a person skilled in the art having the benefit of this disclosure. The embodiments illustrate examples of interrupts set on certain control block numbers within a regular, and repeating sequence of control blocks within a chain. The control block number at which interrupts occur within the exemplary tables are shown as having a value N equal to a rather small number, only for sake of brevity. It is understood that N can be quite large and, if desired, larger than 4. It is intended that the following claims be interpreted to embrace all such modifications and changes and, accordingly, the specification and drawings are to be regarded in an illustrative rather than a restrictive sense.

What is claimed is:

1. A computer system, comprising a bus interface unit operably linked between a processor, a system memory and a peripheral device for transferring a chain of direct memory access (DMA) cycles from the peripheral device to the system memory and storing an identifier of a DMA cycle into storage devices within both the bus interface unit and the system memory at a time in which an interrupt is forwarded to the processor, wherein the identifier of the DMA cycle comprises a tag field value and a software tag value.

2. The computer system as recited in claim 1, wherein at least a portion of the system memory is embodied upon a semiconductor substrate.

3. The computer system as recited in claim 1, wherein the peripheral device is selected from a group comprising CD ROM, CD R, CD R/W and DVD.

4. The computer system as recited in claim 1, wherein the tag field value is stored in a hardware tag register within the bus interface unit during the time in which the interrupt is forwarded to the processor, and wherein the software tag value is stored within a portion of the system memory during the time in which the interrupt is forwarded.

5. An apparatus, comprising:
a system memory which includes a software tag register and further includes a portion of the system memory configured to store a chain of control blocks used to control data transfers within a chain of corresponding direct memory access (DMA) transfers, wherein each of the chain of control blocks includes a tag field value;
a DMA controller coupled to the system memory, wherein the DMA controller is configured to receive the tag field value and produce a software tag value during select times when the DMA controller initiates a current interrupt cycle; and
wherein the combination of the tag field value and the software tag value defines when the data transfers attributed to at least one of the chain of control blocks is to be forwarded.

6. The apparatus as recited in claim 5, wherein the software tag value is incremented after a defined number of tag field values are received by the DMA controller.

7. The apparatus as recited in claim 5, wherein the DMA controller comprises a hardware tag register configured to receive the tag field value, and wherein the system memory comprises a software tag register configured to receive the software tag value.

8. The apparatus as recited in claim 7, wherein the DMA controller and hardware tag register operate in conjunction to (i) store a next tag field value and (ii) set the tag field value to a previous tag field value during initiation of an interrupt cycle following the current interrupt cycle.

9. The apparatus as recited in claim 8, wherein the DMA controller is further configured to forward data transfers associated with control blocks arising in the interim between a control block having the next tag field value and a control block having the previous tag field value.

10. The apparatus as recited in claim 7, wherein the DMA controller comprises logic which notes a control block being transferred during initiation of the current interrupt cycle, and further notes if a subsequent interrupt cycle immediately following the current interrupt cycle is missed due to the DMA transfer associated with the current interrupt cycle not being completed before the subsequent interrupt cycle occurs.

11. The apparatus as recited in claim 10, wherein the DMA controller comprises logic which compares the tag field value stored within the hardware tag register with the summation of the software tag value within the software tag register and the number of interrupt cycles missed.

12. The apparatus as recited in claim 11 wherein, if the logic determines the tag field value is equal to the software tag value plus the number of interrupt cycles missed, then the DMA controller is further configured to forward data transfers attributed to control blocks which culminate in a control block called upon when the missed interrupt cycle occurs.

13. A method for controlling the transfer of data associated with a chain of direct memory access (DMA) cycles, the method comprising:
forwarding a chain of control blocks which control transfer of data associated with respective ones of the chain of DMA cycles;
noting a control block within the chain of control blocks being transferred during a time in which an interrupt occurs, placing an identifier of the control block comprising a tag field value and a software tag value into a hardware tag register and a software tag register, and incrementing the software tag register during the interrupt; and
transferring a portion of the chain of DMA cycles up to a DMA cycle attributed to the control block.

14. The method as recited in claim 13, wherein said transferring comprises processing the chain of control blocks beginning at a control block transferred when the immediately preceding interrupt occurred and ending at the control identified by values within the hardware tag register and the software tag register.

15. The method as recited in claim 14, wherein said processed chain of control blocks correspond to said portion of respective chain of DMA cycles.

16. The method as recited in claim 13, wherein said transferring comprises processing the chain of control blocks beginning at a control block transferred when a preceding interrupt occurred and ending at a control block transferred after which at least one previous interrupt occurs but was missed.

17. The method as recited in claim 16, wherein said processing the chain of control blocks ends when at a control block is identified by a combination of missed interrupts and a value within the software tag register.

18. The method as recited in claim 17, wherein said processed chain of control blocks correspond to said portion of respective chain of DMA cycles.

* * * * *